(12) United States Patent
Murakami et al.

(10) Patent No.: US 11,448,299 B2
(45) Date of Patent: Sep. 20, 2022

(54) DRIVE APPARATUS FOR FOUR-WHEEL DRIVE VEHICLE

(71) Applicant: SUBARU CORPORATION, Tokyo (JP)

(72) Inventors: Mamoru Murakami, Tokyo (JP); Naohiro Imamura, Tokyo (JP); Takahito Inoh, Tokyo (JP); Koki Mitsumoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 169 days.

(21) Appl. No.: 16/901,630

(22) Filed: Jun. 15, 2020

(65) Prior Publication Data

US 2021/0033182 A1    Feb. 4, 2021

(30) Foreign Application Priority Data

Jul. 30, 2019 (JP) .............................. JP2019-140125

(51) Int. Cl.
*B60K 17/356* (2006.01)
*F16H 48/11* (2012.01)
(Continued)

(52) U.S. Cl.
CPC .............. *F16H 48/11* (2013.01); *B60K 17/20* (2013.01); *B60K 17/22* (2013.01); *B60K 17/348* (2013.01);
(Continued)

(58) Field of Classification Search
CPC ............... F16H 48/11; F16H 2048/104; F16H 2048/106; F16H 48/22; B60K 17/20; B60K 17/22; B60K 17/348; B60K 17/356; B60K 2023/043; B60K 17/046; B60K 17/344; B60K 23/04; B60K 23/0808;
(Continued)

(56) References Cited

U.S. PATENT DOCUMENTS

2014/0284130 A1    9/2014 Knoblauch
2017/0136870 A1 *   5/2017 Littlefield ............ B60K 17/356

FOREIGN PATENT DOCUMENTS

CN      103963638 A  *  8/2014
DE   202009014189 U1  *  3/2011  ............... B60K 1/02
(Continued)

*Primary Examiner* — Justin Holmes
(74) *Attorney, Agent, or Firm* — Troutman Pepper Hamilton Sanders LLP (57) ABSTRACT

A drive apparatus for an electric-motor four-wheel drive vehicle includes first and second motors, first and second differential mechanisms, and a propeller shaft. The vehicle includes a first wheel pair including first left and right wheels and a second wheel pair including second left and right wheels and positioned on opposite side to the first wheel pair in a front-rear direction. The first and second motors are configured to output first output torque and second output torque, respectively. The first differential mechanism is configured to distribute the first output torque to a first torque-transmitting member coupled to the first left wheel and a third torque-transmitting member coupled to the propeller shaft. The second differential mechanism is configured to distribute the second output torque to the third torque-transmitting member and a second torque-transmitting member coupled to the first right wheel.

15 Claims, 6 Drawing Sheets

(51) Int. Cl.
  *B60K 17/16* (2006.01)
  *B60K 17/348* (2006.01)
  *B60K 17/22* (2006.01)
  *F16H 48/10* (2012.01)

(52) U.S. Cl.
  CPC ...... *B60K 17/356* (2013.01); *F16H 2048/104* (2013.01); *F16H 2048/106* (2013.01)

(58) Field of Classification Search
  CPC .... B60K 2007/0046; B60K 2007/0061; B60K 7/0007; B60K 17/346; B60K 1/02; B60K 17/165; B60K 2001/001
  See application file for complete search history.

(56) References Cited

FOREIGN PATENT DOCUMENTS

| | | | | |
|---|---|---|---|---|
| EP | 0544597 A1 | * | 6/1993 | ............. B60L 50/66 |
| JP | 2015-506862 A | | 3/2015 | |

* cited by examiner

DRIVE APPARATUS FOR FOUR-WHEEL DRIVE VEHICLE

CROSS-REFERENCE TO RELATED APPLICATIONS

The present application claims priority from Japanese Patent Application No. 2019-140125 filed on Jul. 30, 2019, the entire contents of which are hereby incorporated by reference.

BACKGROUND

The technology relates to a drive apparatus, for an electric-motor four-wheel drive vehicle, that drives the electric-motor four-wheel drive vehicle.

Recently, a four-wheel drive electric vehicle using output from an electric motor as driving force has been developed. For example, Japanese Unexamined Patent Application Publication (Translation of PCT Application) (JP-A) No. 2015-506862 discloses a drivetrain, for an automobile that is configured to drive all wheels with only electricity. The drivetrain is configured to drive each of left-front, right-front, left-rear, and right-rear wheels. More specifically, JP-A No. 2015-506862 proposes a drivetrain that includes a differential disposed on each of a front axle and a rear axle. A portion of driving torque from two electric motors, i.e., a left electric motor and a right electric motor, coupled to one of the front and rear axles is transmitted to the other of the front and rear axles via an orthogonal gear and a propeller shaft, allowing for driving of the four wheels.

SUMMARY

An aspect of the technology provides a drive apparatus for an electric-motor four-wheel drive vehicle. The electric-motor four-wheel drive vehicle includes a first wheel pair and a second wheel pair positioned on opposite side to the first wheel pair in a front-rear direction. The first wheel pair includes a first left wheel and a first right wheel. The second wheel pair includes a second left wheel and a second right wheel. The drive apparatus includes a first motor, a second motor, a first differential mechanism, a second differential mechanism, and a propeller shaft. The first motor is configured to output first output torque. The second motor is configured to output second output torque. The first differential mechanism is coupled to the first motor. The second differential mechanism is coupled to the second motor. The propeller shaft is configured to transmit the first output torque, the second output torque, or both to both of the second left wheel and the second right wheel. The first differential mechanism is configured to distribute the first output torque to a first torque-transmitting member and a third torque-transmitting member. The first torque-transmitting member is coupled to the first left wheel. The third torque-transmitting member is coupled to the propeller shaft. The second differential mechanism is configured to distribute the second output torque to a second torque-transmitting member and the third torque-transmitting member. The second torque-transmitting member is coupled to the first right wheel.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

A drivetrain disclosed in JP-A No. 2015-506862 requires to absorb a difference in revolutions between front wheels and rear wheels resulting from a turning radius difference when a vehicle is turning, for example, by means of a part such as a coupling. This can limit freedom of control of torque distribution to front side and rear side.

It is desirable to provide a drive apparatus, for a four-wheel drive vehicle, that is able to control driving force to be transmitted to each of left-front, right-front, left-rear, and right-rear driving wheels only by controlling outputs from left and right electric motors without using any front-rear differential revolution absorbing mechanism such as a coupling.

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

First Example Embodiment

1. Overall Configuration of Drive Apparatus

Figure 1:
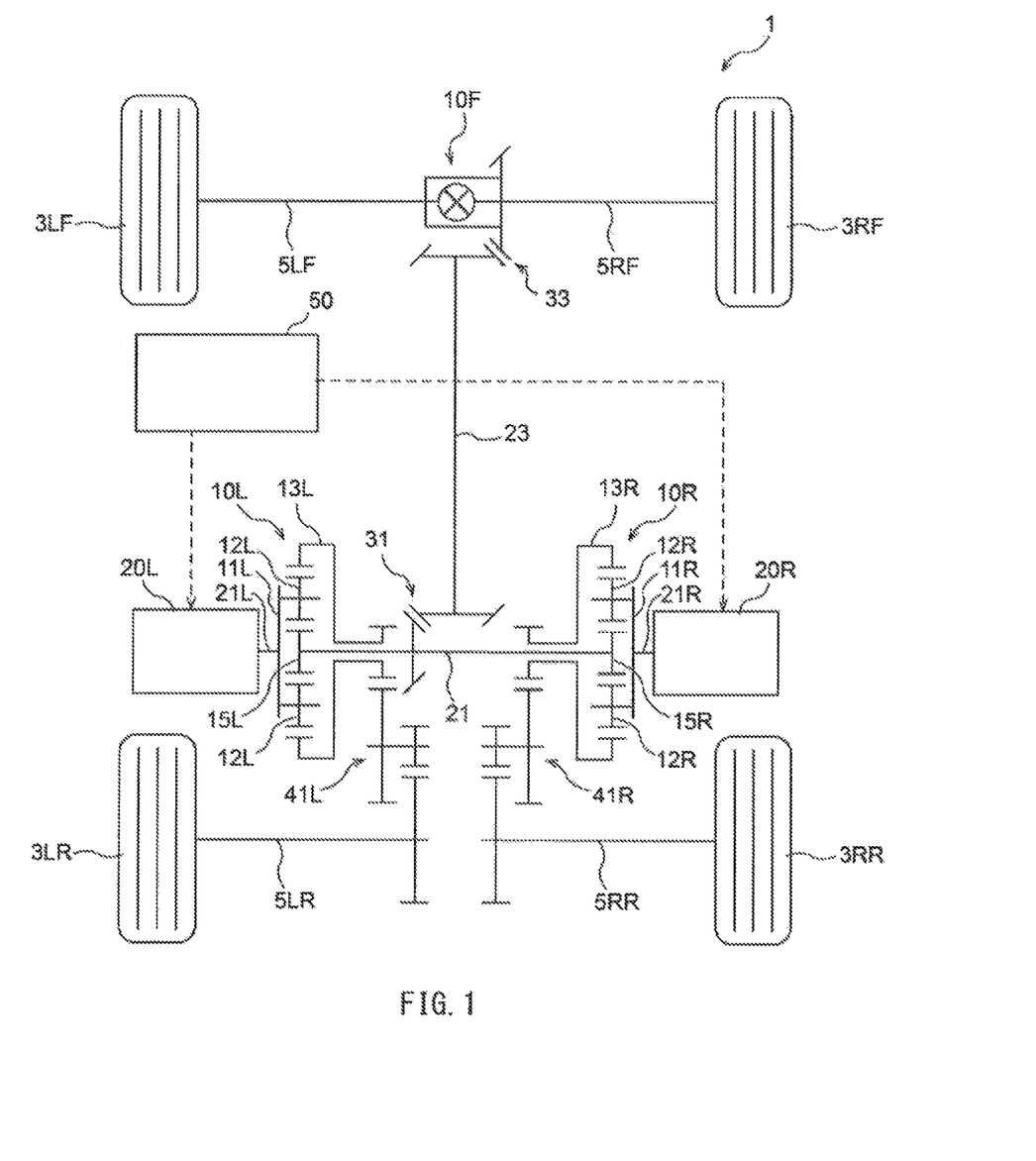
FIG. 1 is a schematic diagram illustrating an example of a configuration of a drive apparatus for a four-wheel drive vehicle according to one embodiment of the technology.

An overall configuration of a drive apparatus for a four-wheel drive vehicle according to a first example embodiment of the technology is described with reference to FIG. 1. FIG. 1 schematically illustrates an overall configuration of a drive apparatus 1 according to the first example embodiment. The drive apparatus 1 described as an example in the first example embodiment may be for an all-wheel drive (AWD) vehicle in which rear wheels, i.e., a left-rear wheel 3LR and a right-rear wheel 3RR, serve as main driving wheels and output torque from two electric motors on left and right sides, i.e., a first motor 20L and a second motor 20R, is distributed to front wheels, i.e., a left-front wheel 3LF and a right-front wheel 3RF and the rear wheels, i.e. the left-rear wheel 3LR and the right-rear wheel 3RR. Hereinafter, the left-rear wheel 3LR and the right-rear wheel 3RR may be collectively referred to as "rear wheels 3LR and 3RR" in some cases, and the left-front wheel 3LF and the right-front wheel 3RF may be collectively referred to as "front wheels 3LF and 3RF" in some cases.

The drive apparatus 1 may include, for example but not limited to, the first motor 20L, the second motor 20R, a first differential mechanism 10L, a second differential mechanism 10R, a first orthogonal gear 31, a propeller shaft 23, a second orthogonal gear 33, and a third differential mechanism 10F. The first motor 20L and the second motor 20R may be, for example but not limited to, known synchronized motors. An electronic control device 50 may control an unillustrated inverter, thereby controlling the first motor 20L and the second motor 20R, for example. The first motor 20L may include an output shaft 21L coupled to the first differential mechanism 10L. The second motor 20R may include an output shaft 21R coupled to the second differential mechanism 10R.

The first differential mechanism 10L may include a planetary gear mechanism provided with a sun gear 15L, a pinion gear 12L, a ring gear 13L, and a carrier 11L that supports the pinion gear 12L. The output shaft 21L of the first motor 20L may be coupled to the carrier 11L, allowing output torque from the first motor 20L to be transmitted to the first differential mechanism 10L via the carrier 11L. The first differential mechanism 10L may distribute the output torque from the first motor 20L to the left-rear wheel 3LR and the front wheels 3LF and 3RF. In one example, a portion of the output torque from the first motor 20L may be transmitted to a drive axle 5LR of the left-rear wheel 3LR via the ring gear 13L and the gear mechanism 41L. Another portion of the output torque from the first motor 20L may be transmitted to an intermediate output shaft 21 via the sun gear 15L and further transmitted to the propeller shaft 23 via the first orthogonal gear 31.

The second differential mechanism 10R may include a planetary gear mechanism provided with a sun gear 15R, a pinion gear 12R, a ring gear 13R, and a carrier 11R that supports the pinion gear 12R. The output shaft 21R of the second motor 20R may be coupled to the carrier 11R, allowing output torque from the second motor 20R to be transmitted to the second differential mechanism 10R via the carrier 11R. The second differential mechanism 10R may distribute the output torque from the second motor 20R to the right-rear wheel 3RR and the front wheels 3LF and 3RF. In one example, a portion of the output torque from the second motor 20R may be transmitted to a drive axle 5RR of the right-rear wheel 3RR via the ring gear 13R and the gear mechanism 41R. Another portion of the output torque from the second motor 20R may be transmitted to the intermediate output shaft 21 via the sun gear 15R and further transmitted to the propeller shaft 23 via the first orthogonal gear 31.

The propeller shaft 23 may be coupled to the third differential mechanism 10F via the second orthogonal gear 33. The third differential mechanism 10F may be coupled to a drive axle 5LF of the left-front wheel 3LF and a drive axle 5RF of the right-front wheel 3RF. The third differential mechanism 10F may include, for example but not limited to, a known differential gear provided with two unillustrated side gears and unillustrated pinion gear meshed with the two side gears. One of the two side gears may be coupled to the drive axle 5LF of the left-front wheel 3LF and the other of the two side gears may be coupled to the drive axle 5RF of the right-front wheel 3RF. The third differential mechanism 10F may be configured to generate deferential revolution between the left-front wheel 3LF and the right-front wheel 3RF when the vehicle is turning, when the vehicle is traveling on a rough road, or when the vehicle is in any other suitable situation, for example.

The propeller shaft 23 may transmit driving force between the two motors, i.e., the first motor 20L and the second motor 20R, and the front wheels 3LF and 3RF. In one example, a portion of the output torque from the first motor 20L and a portion of the output torque from the second motor 20R may be transmitted to the intermediate output shaft 21 common to the first motor 20L and the second motor 20R. The combined torque may be transmitted to the third differential mechanism 10F via the first orthogonal gear 31, the propeller shaft 23, and the second orthogonal gear 33. The third differential mechanism 10F may distribute the torque to the left-front wheel 3LF and the right-front wheel 3RF in accordance with frictional resistance or revolution resistance of the left-front wheel 3LF and the right-front wheel 3RF.

The output shaft 21L of the first motor 20L and the output shaft 21R of the second motor 20R may be disposed in parallel to the drive axle 5LR of the left-rear wheel 3LR and the drive axle 5RR of the right-rear wheel 3RR, respectively, in the first example embodiment. This allows the output torque from the first motor 20L and the output torque from the second motor 20R to be transmitted to the drive axle 5LR of the left-rear wheel 3LR and the drive axle 5RR of the right-rear wheel 3RR, respectively, efficiently by means of a spur gear via no orthogonal gear.

The electronic control device 50 may include, for example but not limited to, a processor such as a central processing unit (CPU) or a micro processing unit (MPU), an electric circuit, and a storage device such as a random-access memory (RAM) or a read-only memory (ROM). In one example, a portion or all of the electronic control device 50 may be updatable and may be implemented as, for example but not limited to, firmware. In another example, a portion or all of the electronic control device 50 may be a program module to be executed in accordance with a command from a device such as a CPU.

In the drive apparatus 1 according to the first example embodiment, the drive axle 5LF of the left-front wheel 3LF and the drive axle 5RF of the right-front wheel 3RF may be coupled to each other via the third differential mechanism 10F. The drive axle 5LR of the left-rear wheel 3LR and the drive axle 5RR of the right-rear wheel 3RR may be coupled to each other via the first differential mechanism 10L and the second differential mechanism 10R, preventing direct transmission of revolution from one to the other of the rear wheels 3LR and 3RR.

The drive apparatus 1 according to the first example embodiment may distribute the output torque from the first motor 20L to the left-rear wheel 3LR and the front wheels 3LF and 3RF. The drive apparatus 1 according to the first example embodiment may also distribute the output torque from the second motor 20R to the right-rear wheel 3RR and the rear wheels 3LR and 3RR. The drive apparatus 1 may so perform the distribution that the output torque is distributed in accordance with loads or revolution resistance of the respective driving wheels, i.e., the left-front wheel 3LF, the right-front 3RF, the left-rear wheel 3LR, and the right-rear wheel 3RR. Further, the drive apparatus 1 may control the output torque from the first motor 20L and the output torque from the second motor 20R on the basis of differential revolution resulting from a turning radius difference between the left-rear wheel 3LR and the right-rear wheel 3RR, thereby controlling the output torque to be transmitted to each of the driving wheels, i.e., each of the left-front wheel 3LF, the right-front 3RF, the left-rear wheel 3LR, and the right-rear wheel 3RR.

In one embodiment, the left-rear wheel 3LR, the right-rear wheel 3RR, the left-front wheel 3LF, and the right-front wheel 3RF may serve as a "first left wheel", a "first right wheel", a "second left wheel", and a "second right wheel". In one embodiment, the gear mechanism 41L and the drive axle 5LR may serve as a "first torque-transmitting member". In one embodiment, the gear mechanism 41R and the drive axle 5RR may serve as a "second torque-transmitting member". In one embodiment, the intermediate output shaft 21 and the first orthogonal gear 31 may serve as a "third torque-transmitting member". In one embodiment, the intermediate output shaft 21 may serve as a "common output shaft". In one embodiment, the drive axle 5LR and the drive axle 5RR may serve as a "first drive axle" and a "second drive axle", respectively. In one embodiment, the output shaft 21L and the output shaft 21R may serve as a "first output shaft" and a "second output shaft", respectively. In one embodiment, the first orthogonal gear 31 may serve as a "first orthogonal gear".

2. Operation Example

Figure 2:
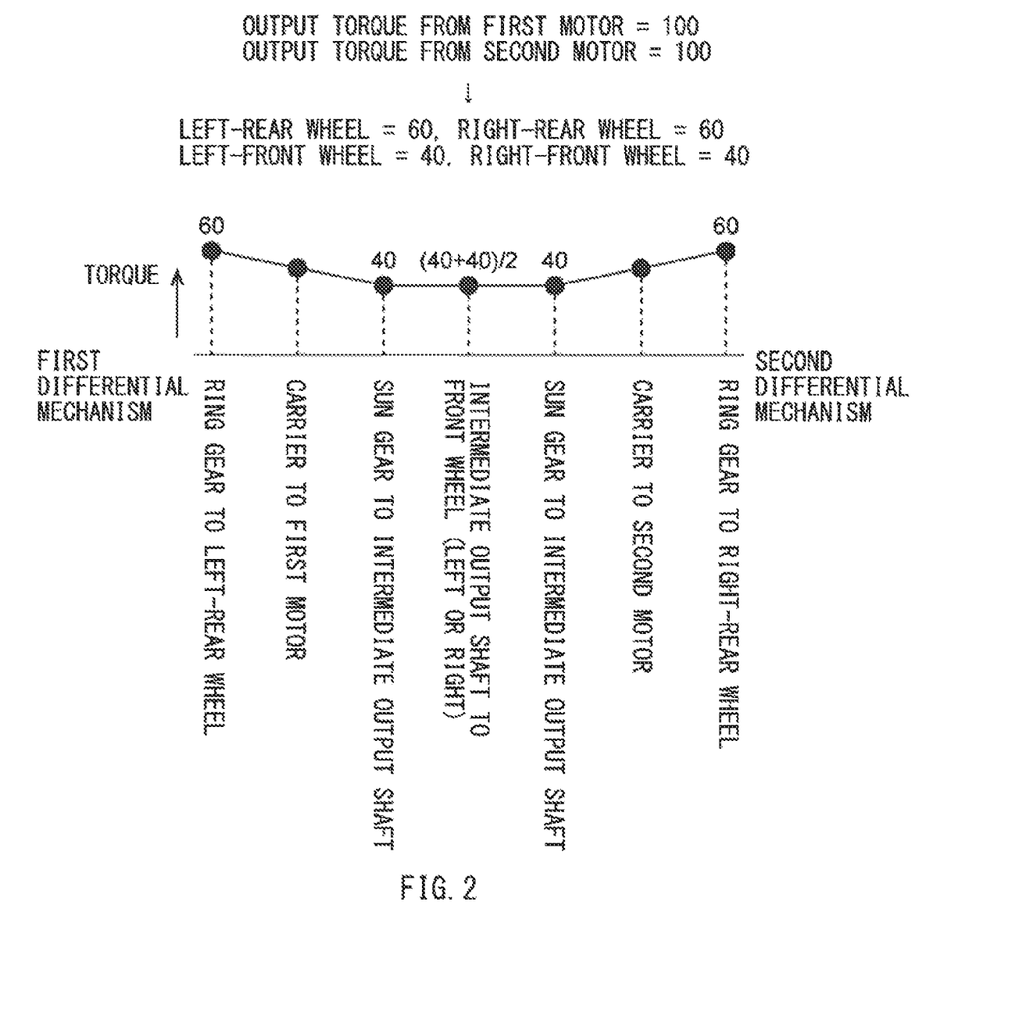
FIG. 2 is an explanatory diagram illustrating an example of operation of the drive apparatus for the four-wheel drive vehicle according to one embodiment of the technology.
Figure 3:
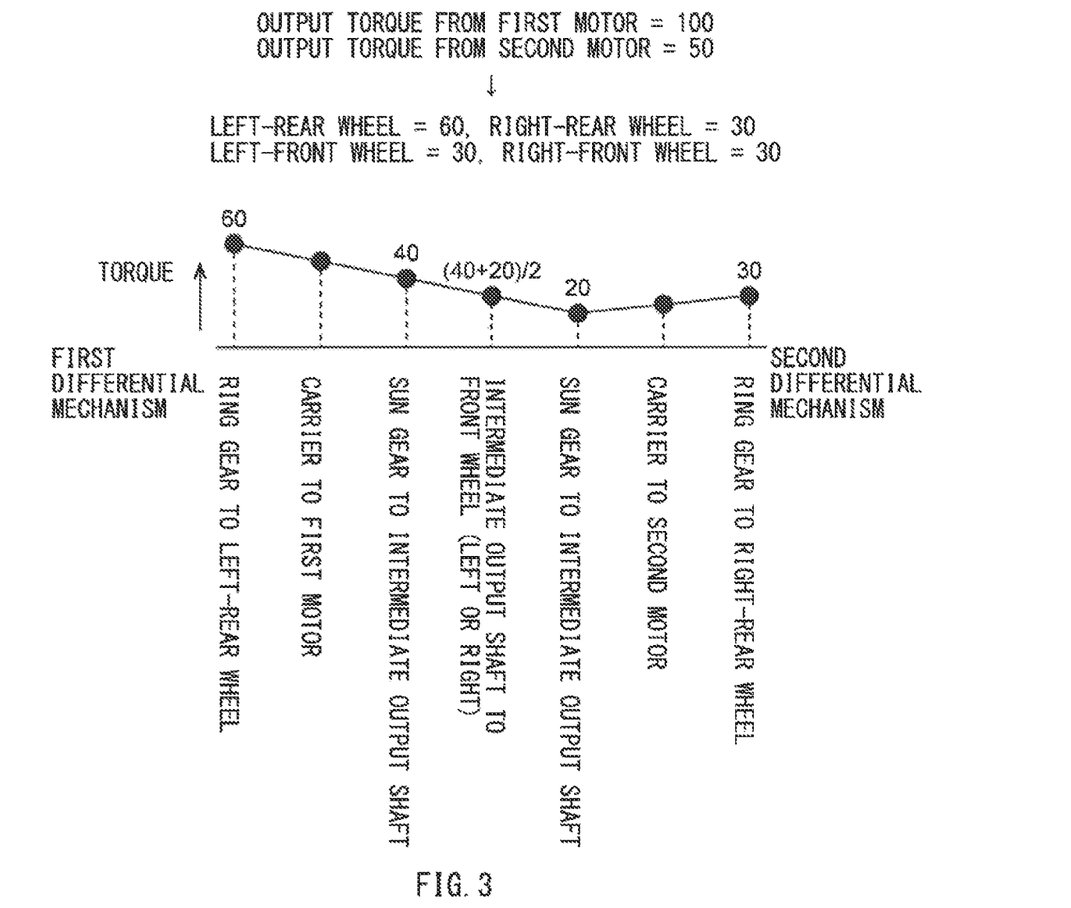
FIG. 3 is an explanatory diagram illustrating another example of the operation of the drive apparatus for the four-wheel drive vehicle according to one embodiment of the technology.
Figure 4:
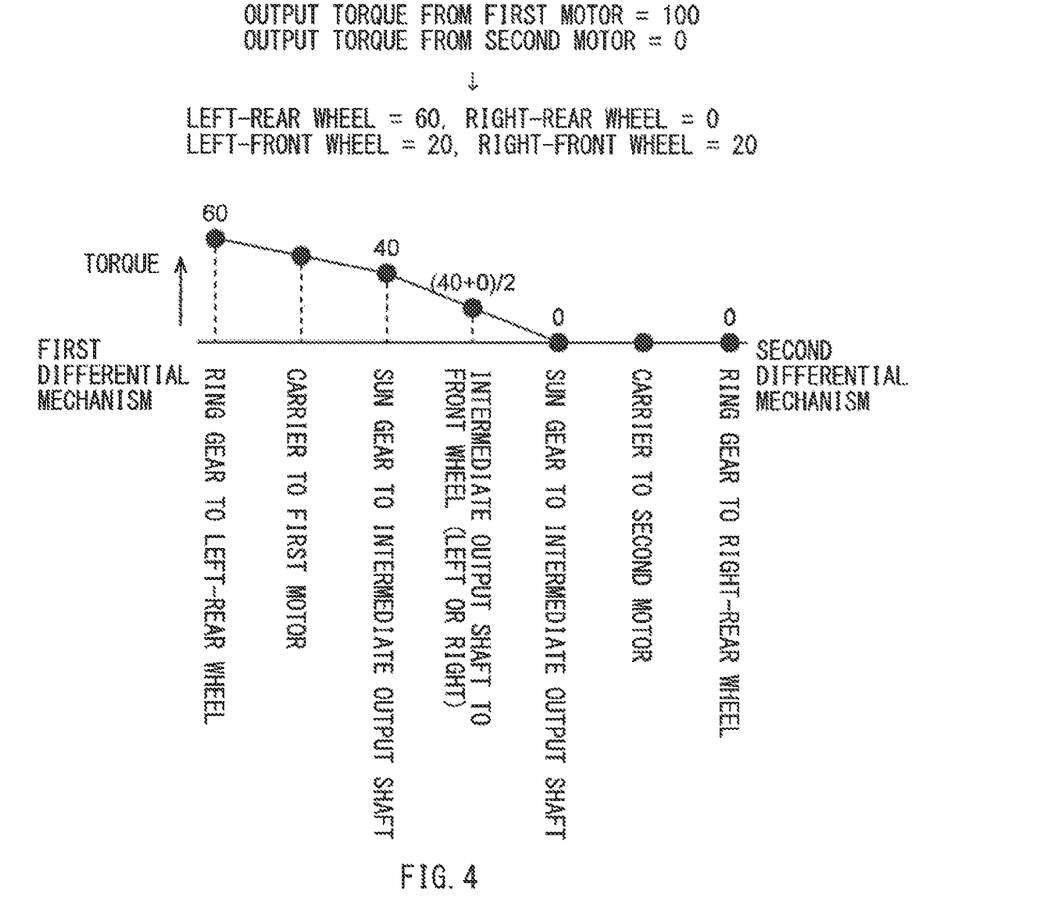
FIG. 4 is an explanatory diagram illustrating still another example of the operation of the drive apparatus for the four-wheel drive vehicle according to one embodiment of the technology.

Description is given next of an example of operation of the drive apparatus 1 according to the first example embodiment with reference to FIGS. 2 to 4. The operation example below refers to an example case where the first differential mechanism 10L and the second differential mechanism 10R distribute torque to the rear wheels 3LR and 3RR and the front wheels 3LF and 3RF at a ratio of 60:40; however, the ratio of distribution of torque to the rear wheels 3LR and 3RR and the front wheels 3LF and 3RF is not limited thereto.

FIG. 2 describes relative values of torque to be transmitted to the respective driving wheels, i.e., the left-front wheel 3LF, the right-front 3RF, the left-rear wheel 3LR, and the right-rear wheel 3RR where a relative value of the output torque from the first motor 20L is 100 and a relative value of the output torque from the second motor 20R is 100.

The output torque from the first motor 20L may be transmitted to the first differential mechanism 10L via the carrier 11L and distributed to the left-rear wheel 3LR and the intermediate output shaft 21 coupled to the front wheels 3LF and 3RF at a ratio of 60:40. In the example illustrated in FIG. 2, output torque having a relative value of 60 may be transmitted to the left-rear wheel 3LR via the ring gear 13L, and output torque having a relative value of 40 may be transmitted to the intermediate output shaft 21 via the sun gear 15L.

The output torque from the second motor 20R may be transmitted to the second differential mechanism 10R via the carrier 11R and distributed to the right-rear wheel 3RR and the intermediate output shaft 21 coupled to the front wheels 3LF and 3RF at a ratio of 60:40. In the example illustrated in FIG. 2, output torque having a relative value of 60 may be transmitted to the right-rear wheel 3RR via the ring gear 13R, and output torque having a relative value of 40 may be transmitted to the intermediate output shaft 21 via the sun gear 15R.

Torque combining a portion, of the output torque from the first motor 20L, transmitted to the intermediate output shaft 21 having the relative value of 40 and a portion, of the output torque from the second motor 20R, transmitted to the intermediate output shaft 21 having the relative value of 40, i.e., combined torque having a relative value of 80 may be transmitted to the third differential mechanism 10F via the first orthogonal gear 31, the propeller shaft 23, and the second orthogonal gear 33. The output torque having the relative value of 80 in total may be thereby transmitted to the front wheels 3LF and 3RF. This output torque may be distributed to the left-front wheel 3LF and the right-front wheel 3RF at a ratio of 50:50. In other words, output torque having a relative value of 40 may be distributed to each of the left-front wheel 3LF and the right-front wheel 3RF.

FIG. 3 describes relative values of torque to be transmitted to the respective driving wheels, i.e., the left-front wheel 3LF, the right-front 3RF, the left-rear wheel 3LR, and the right-rear wheel 3RR where a relative value of the output torque from the first motor 20L is 100 and a relative value of the output torque from the second motor 20R is 50.

The output torque from the first motor 20L may be transmitted to the first differential mechanism 10L via the carrier 11L and distributed to the left-rear wheel 3LR and the intermediate output shaft 21 coupled to the front wheels 3LF and 3RF at a ratio of 60:40. In the example illustrated in FIG. 3, output torque having a relative value of 60 may be transmitted to the left-rear wheel 3LR via the ring gear 13L, and output torque having a relative value of 40 may be transmitted to the intermediate output shaft 21 via the sun gear 15L.

The output torque from the second motor 20R may be transmitted to the second differential mechanism 10R via the carrier 11R and distributed to the right-rear wheel 3RR and the intermediate output shaft 21 coupled to the front wheels 3LF and 3RF at a ratio of 60:40. In the example illustrated in FIG. 3, output torque having a relative value of 30 may be transmitted to the right-rear wheel 3RR via the ring gear 13R, and output torque having a relative value of 20 may be transmitted to the intermediate output shaft 21 via the sun gear 15R.

Torque combining a portion, of the output torque from the first motor 20L, transmitted to the intermediate output shaft 21 having the relative value of 40 and a portion, of the output torque from the second motor 20R, transmitted to the intermediate output shaft 21 having the relative value of 20, i.e., combined torque having a relative value of 60 may be transmitted to the third differential mechanism 10F via the first orthogonal gear 31, the propeller shaft 23, and the second orthogonal gear 33. The output torque having the relative value of 60 in total may be thereby transmitted to the front wheels 3LF and 3RF. This output torque may be distributed to the left-front wheel 3LF and the right-front wheel 3RF at a ratio of 50:50. In other words, output torque having a relative value of 30 may be distributed to each of the left-front wheel 3LF and the right-front wheel 3RF.

FIG. 4 describes relative values of torque to be transmitted to the respective driving wheels, i.e., the left-front wheel 3LF, the right-front 3RF, the left-rear wheel 3LR, and the right-rear wheel 3RR where a relative value of the output torque from the first motor 20L is 100 and a relative value of the output torque from the second motor 20R is 0 (zero).

Because the output torque from the second motor 20R is 0 (zero), the output torque to be transmitted to the right-rear wheel 3RR and the intermediate output shaft 21 may be also 0 (zero). The output torque from the first motor 20L may be transmitted to the first differential mechanism 10L via the carrier 11L and distributed to the left-rear wheel 3LR and the intermediate output shaft 21 coupled to the front wheels 3LF and 3RF at a ratio of 60:40. In the example illustrated in FIG. 4, the output torque having relative value of 60 may be transmitted to the left-rear wheel 3LR via the ring gear 13L, and the output torque having a relative value of 40 may be transmitted to the intermediate output shaft 21 via the sun gear 15L.

A portion, of the output torque from the first motor 20L, transmitted to the intermediate output shaft 21 having the relative value of 40 may be transmitted to the third differential mechanism 10F via the first orthogonal gear 31, the propeller shaft 23, and the second orthogonal gear 33. The output torque having the relative value of 40 may be thereby transmitted to the front wheels 3LF and 3RF. This output torque may be distributed to the left-front wheel 3LF and the right-front wheel 3RF at a ratio of 50:50. In other words, output torque having a relative value of 20 may be distributed to each of the left-front wheel 3LF and the right-front wheel 3RF.

As described above, the drive apparatus 1 according to the first example embodiment may appropriately control the output of the first motor 20L outputting the torque to be distributed to the left-rear wheel 3LR and the front wheels 3LF and 3RF and the output of the second motor 20R outputting the torque to be distributed to the right-rear wheel 3RR and the front wheels 3LF and 3RF, thereby allowing control of driving force to be transmitted to each of the driving wheels, i.e., each of the left-front wheel 3LF, the right-front 3RF, the left-rear wheel 3LR, and the right-rear wheel 3RR. The drive apparatus 1 configured as described above does not require any differential revolution absorbing mechanism such as a coupling directed to absorption of a difference in revolution between the front wheels and the rear wheels, thereby allowing for an increase in freedom of direct control of driving force to be transmitted to each of the driving wheels, i.e., each of the left-front wheel 3LF, the right-front 3RF, the left-rear wheel 3LR, and the right-rear wheel 3RR.

3. Control Example

Figure 5:
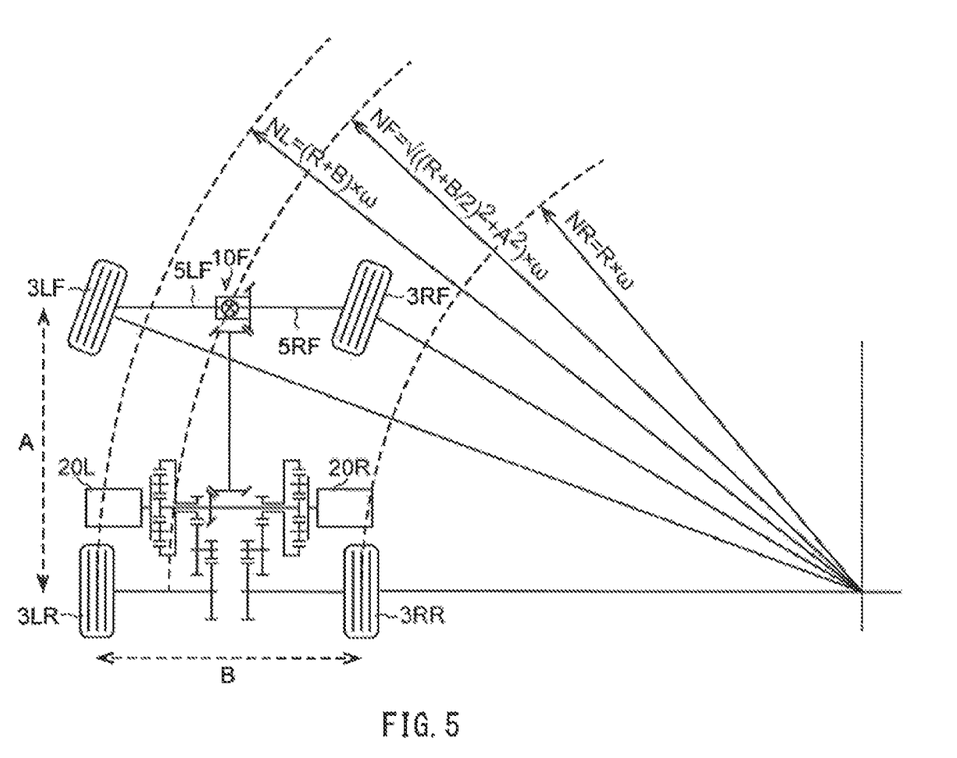
FIG. 5 is an explanatory diagram illustrating an example of revolution speeds of left-front, right-front, left-rear, and right-rear wheels.
Figure 6:
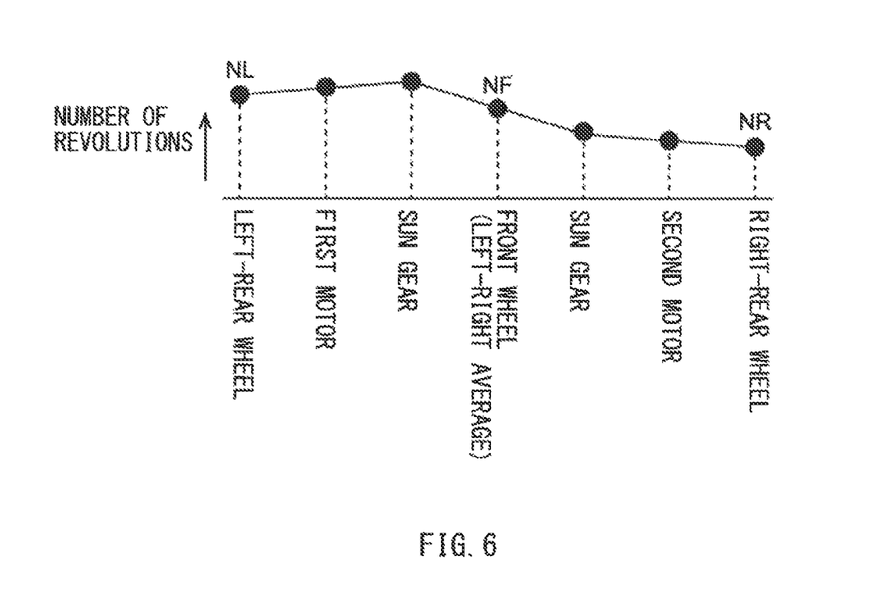
FIG. 6 is an explanatory diagram illustrating an example of control of number of revolutions of a first motor and number of revolutions of a second motor.

Description is given next of an example of control of number of revolutions of the first motor 20L and number of revolutions of the second motor 20R at a time when the four-wheel drive vehicle is turning while accelerating, with reference to FIGS. 5 and 6. The control may be executed by the electronic control device 50. FIG. 5 is a schematic diagram for describing the numbers of revolutions of the left-front wheel 3LF, the right-front wheel 3RF, the left-rear wheel 3LR, and the right-rear wheel 3RR resulting from the turning radius difference when the four-wheel vehicle is turning. The number of revolutions of the lift-front wheel 3LF and the right-front wheel 3RF is indicated by average number of revolutions NF of the front wheels 3LF and 3RF in FIG. 5. FIG. 6 explains the numbers of revolutions of the first motor 20L, the second motor 20R, the left-rear wheel 3LR, the right-rear wheel 3RR, and the front wheels 3LF and 3RF.

As illustrated in FIG. 5, a wheel base of the four-wheel drive vehicle, i.e., a distance from the front drive axles 5LF and 5RF to the rear drive axle 5LR and 5RR, is indicated by "A" and a tread, i.e., a distance from the center of each of the left wheels 3LF and 3LR to the center of corresponding one of the right wheels 3RF and 3RR, is indicated by "B". In this case, a radius of a track of the left-rear wheel 3LR may be represented by R+B, and a radius of a track of a middle position between the left-front wheel 3LF and the right-front wheel 3RF may be represented by $$\sqrt{\left\{\left(R+\frac{B}{2}\right)^2 + A^2\right\}} \times \omega$$

where "R" is a radius of a track of the right-rear wheel 3RR at the time of turning.

The electronic control device 50 may set target number of revolutions of each of the driving wheels, i.e., each of the left-front wheel 3LF, the right-front 3RF, the left-rear wheel 3LR, and the right-rear wheel 3RR, that allows for traveling gripping a road surface without causing a slip of any of the driving wheels, i.e., the left-front wheel 3LF, the right-front 3RF, the left-rear wheel 3LR, and the right-rear wheel 3RR. The electronic control device 50 may set the target number of revolutions on the basis of a difference in radius between the track of the left-rear wheel 3LR and the track of right-rear wheel 3RR calculated above and information of the wheel base, the tread, a steering angle of a steering wheel, and required acceleration of the four-wheel drive vehicle. Further, the electronic control device 50 may determine an average NF_tgt of the target number of revolutions of the left-front wheel 3LF and the target number of revolutions of the right-front wheel 3RF. The electronic control device 50 may further calculate the target number of revolutions or target output of each of the first motor 20L and the second motor 20R with the use of target number of revolutions NL_tgt of the left-rear wheel 3LR, target number of revolutions NR_tgt of the right-rear wheel 3RR, and the average NF_tgt.

The electronic control device 50 may control the output of each of the first motor 20L and the second motor 20R on the basis of the calculated target number of revolutions, i.e., the calculated target output. This appropriately adjusts the driving force to be transmitted to each of the driving wheels, i.e., each of the left-front wheel 3LF, the right-front 3RF, the left-rear wheel 3LR, and the right-rear wheel 3RR, allowing for stable turning.

In one example embodiment, the electronic control device 50 may adjust the target output of each of the first motor 20L and the second motor 20R on the basis of information such as a vehicle speed, a turning acceleration, or a steering angle of a steering wheel to correct a steering characteristic to an oversteer characteristic or an understeer characteristic upon the calculation of the target output of each of the first motor 20L and the second motor 20R.

In another example embodiment, the electronic control device 50 may compare the actual numbers of revolutions of the first motor 20L and the second motor 20R with the target numbers of revolutions of the first motor 20L and the second motor 20R to adjust the outputs of the first motor 20L and the second motor 20R, respectively. For example, in a case where the driving wheel on the inner side slips, the number of revolutions of the second motor 20R increases. Therefore, the electronic control device 50 may increase the number of revolutions, i.e., the output, of the first motor 20L while decreasing the number of revolutions, i.e., the output, of the second motor 20R. This allows the number of revolutions of each of the driving wheels, i.e., each of the left-front wheel 3LF, the right-front 3RF, the left-rear wheel 3LR, and the right-rear wheel 3RR, to be closer to the target number of revolutions while keeping the total output torque.

Second Example Embodiment

Figure 7:
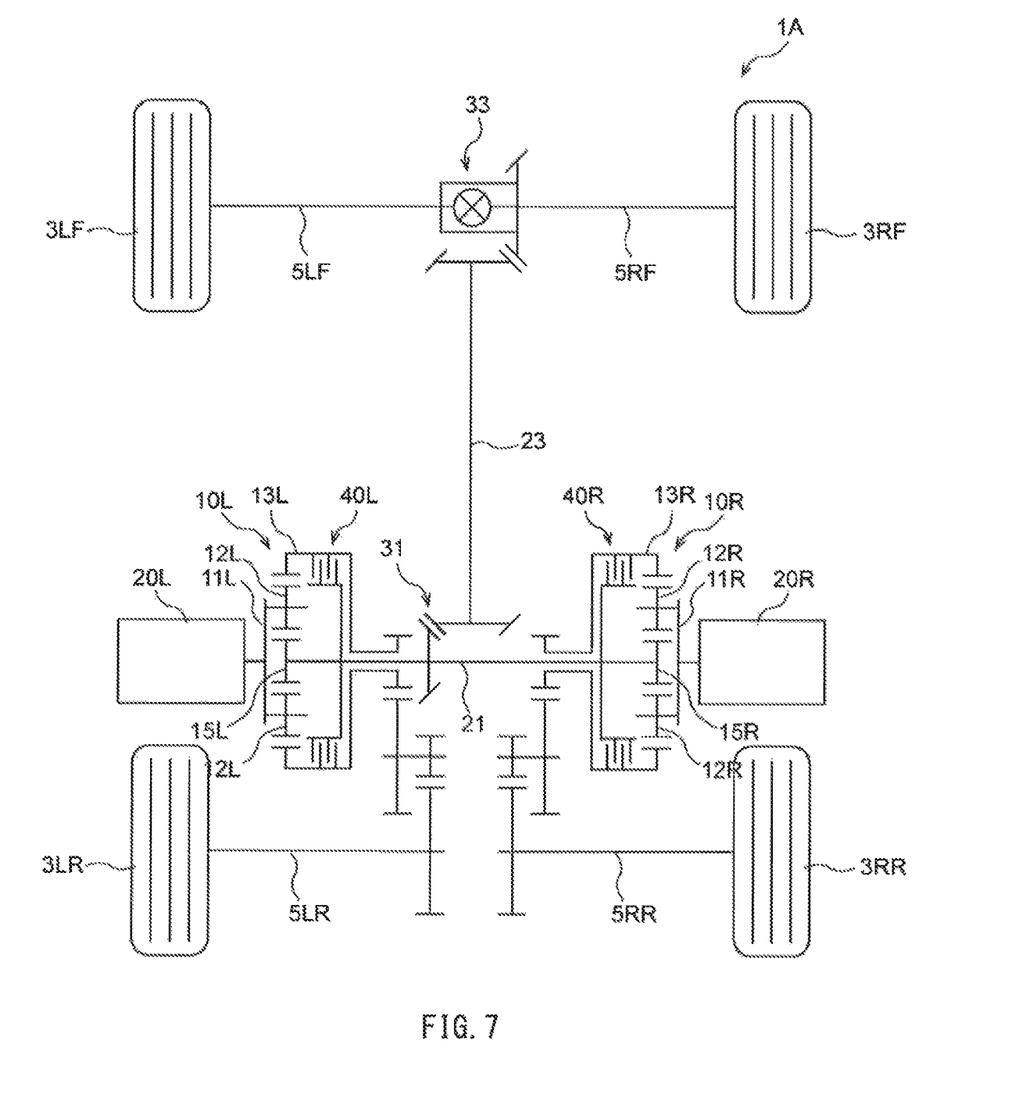
FIG. 7 is a schematic diagram illustrating an example of a configuration of a drive apparatus for a four-wheel drive vehicle according to one embodiment of the technology.

Description is given next of a drive apparatus for a four-wheel drive vehicle according to a second example embodiment with reference to FIG. 7. A drive apparatus 1A according to the second example embodiment is different from the drive apparatus 1 according to the first example embodiment in that the first differential mechanism 10L and the second differential mechanism 10R may be provided with a first limited slip differential gear 40L and a second limited slip differential gear 40R, respectively. Regarding the drive apparatus 1A according to the second example embodiment, differences from the drive apparatus 1 according to the first example embodiment are described below.

In the drive apparatus 1A according to the second example embodiment, the first differential mechanism 10L may include the first limited slip differential gear 40L. The drive of the first limited slip differential gear 40L may be controlled by the electronic control device 50, limiting a differential of the first differential mechanism 10L. The second differential mechanism 10R may include the second limited slip differential gear 40R. The drive of the second limited slip differential gear 40R may be controlled by the electronic control device 50, limiting a differential of the second differential mechanism 10R.

For example, in a case where the left-rear wheel 3LR is slipping, the revolution resistance of the left-rear wheel 3LR may be remarkably smaller than that of the intermediate output shaft 21 coupled to the front wheels 3LF and 3RF. If the first limited slip differential gear 40L is not provided in this case, all or most of the output torque from the first motor 20L may be transmitted to the left-rear wheel 3LR by means of the first differential mechanism 10L. Accordingly, driving wheels other than the left-rear wheel 3LR may receive only the output torque from the second motor 20R. This can make it difficult for the vehicle to get rid of the slipping or to start in some cases.

In contrast, in a case where the first limited slip differential gear 40L is provided, the first limited slip differential gear 40L may be driven to limit the differential of the first differential mechanism 10L when the left-rear wheel 3LR is slipping, thereby allowing for redistribution of the output torque from the first motor 20L to driving wheels other than the left-rear wheel 3LR via the intermediate output shaft 21. This makes it easier for the vehicle to get rid of the slipping or to start.

A case where the right-rear wheel 3RR is slipping may be dealt with in a similar manner as follows. That is, the second limited slip differential gear 40R may be driven to limit the differential of the second differential mechanism 10R when the right-rear wheel 3RR is slipping, thereby allowing for redistribution of the output torque from the second motor 20R to driving wheels other than the right-rear wheel 3RR via the intermediate output shaft 21. This makes it easier for the vehicle to get rid of the slipping or to start.

Non-limiting examples of each of the first limited slip differential gear 40L and the second limited slip differential gear 40R may include a speed-sensitive limited slip differential gear using a part such as a multi-plate clutch or a viscous coupling, a torque-sensitive limited slip differential gear, and a frictional limited slip differential gear using a part such as a helical gear. Moreover, the drive of each of the first limited slip differential gear 40L and the second limited slip differential gear 40R is not necessarily controlled by the electronic control device 50. For example, differential limiting operation of each of the first limited slip differential gear 40L and the second limited slip differential gear 40R may be executed automatically on the basis of a factor such as the number of revolutions.

In one embodiment, the left-front wheel 3LF, the right-front wheel 3RF, the left-rear wheel 3LR, and the right-rear wheel 3RR may serve as the "first left wheel", the "first right wheel", the "second left wheel", and the "second right wheel", respectively.

Although some example embodiments of the technology have been described in detail above with reference to the attached drawings, the example embodiments described above are merely illustrative and should not be construed as limiting the scope of the technology. It is clear that a person having an ordinary knowledge in the technical field can arrive at various modifications and alterations of the example embodiments of the technology without departing from the technical idea as defined by the appended claims. It should be appreciated that such modifications and alternations are also encompassed in the technical scope of the technology.

For example, the drive apparatus 1 according to the first example embodiment may be provided with the first motor 20L and the second motor 20R corresponding to the left-rear wheel 3LR and the right-rear wheel 3RR, respectively, and the left-front wheel 3LF and the right-front wheel 3RF may receive the output torque via the intermediate output shaft 21 common thereto. However, the technology is not limited to this example. In one example embodiment, the first motor 20L and the first differential mechanism 10L may be provided corresponding to the left-front wheel 3LF, the second motor 20R and the second differential mechanism 10R may be provided corresponding to the right-front wheel 3RF, and the left-rear wheel 3LR and the right-rear wheel 3RR may receive the output torque via an output shaft common thereto. The drive apparatus 1 having this configuration according to the example embodiment described above may be applied to a vehicle mainly directed to sport-purpose traveling, thereby further increasing stability of the traveling.

Further, the drive apparatus 1 according to the first example embodiment may cause a portion of the output torque from the first motor 20L and the second motor 20R to be transmitted to the front wheels 3LF and 3RF via the intermediate output shaft 21 that includes the sun gear 15L and the sun gear 15R provided on respective ends and the first orthogonal gear 31. However, the technology is not limited to this example. In one example embodiment, a common output shaft provided with an orthogonal gear and an output shaft of the one, of the first differential mechanism 10L and the second differential mechanism 10R, distributing the output torque to the front wheels 3LF and 3RF may be coupled to each other via a gear mechanism.

According to one embodiment of the technology, it is possible to control driving force to be transmitted to each of left-front, right-front, left-rear, and right-rear driving wheels only by controlling outputs from left and right electric motors without using any front-rear differential revolution absorbing mechanism such as a coupling, as described above.

The invention claimed is:

1. A drive apparatus for an electric-motor four-wheel drive vehicle, the electric-motor four-wheel drive vehicle including a first wheel pair and a second wheel pair positioned on opposite side to the first wheel pair in a front-rear direction, the first wheel pair including a first left wheel and a first right wheel, the second wheel pair including a second left wheel and a second right wheel, the drive apparatus comprising:
   a first motor configured to output first output torque;
   a second motor configured to output second output torque;
   a first differential mechanism coupled to the first motor;
   a second differential mechanism coupled to the second motor;
   a propeller shaft configured to transmit the first output torque, the second output torque, or both to both of the second left wheel and the second right wheel,
   wherein the first differential mechanism is configured to distribute the first output torque to a first torque-transmitting member being coupled to the first left wheel and a third torque-transmitting member other than the first torque-transmitting member and being coupled to the propeller shaft, and
   wherein the second differential mechanism is configured to distribute the second output torque to a second torque-transmitting member being coupled to the first right wheel and the third torque-transmitting member other than the second torque-transmitting member.

2. The drive apparatus according to claim 1, wherein
   the third torque-transmitting member includes a common output shaft, and
   the first output torque transmitted to the third torque-transmitting member via the first differential mechanism and the second output torque transmitted to the third torque-transmitting member via the second differential mechanism are transmitted to the propeller shaft via the common output shaft.

3. The drive apparatus according to claim 2, wherein
   the four-wheel drive vehicle further includes a first drive axle and a second drive axle, the first drive axle being configured to drive the first left wheel, the second drive axle being configured to drive the first right wheel,
   the first motor includes a first output shaft disposed in parallel to the first drive axle,
   the second motor includes a second output shaft disposed in parallel to the second drive axle,
   the third torque-transmitting member further includes a first orthogonal gear, and
   the common output shaft is disposed in parallel to both the first drive axle and the second drive axle and is coupled to the propeller shaft via the first orthogonal gear.

4. The drive apparatus according to claim 1, further comprising
   a third differential mechanism and a second orthogonal gear both provided between the second wheel pair and the propeller shaft, wherein
   the propeller shaft is coupled to the third differential mechanism via the second orthogonal gear.

5. The drive apparatus according to claim 2, further comprising
   a third differential mechanism and a second orthogonal gear both provided between the second wheel pair and the propeller shaft, wherein
   the propeller shaft is coupled to the third differential mechanism via the second orthogonal gear.

6. The drive apparatus according to claim 3, further comprising
   a third differential mechanism and a second orthogonal gear both provided between the second wheel pair and the propeller shaft, wherein
   the propeller shaft is coupled to the third differential mechanism via the second orthogonal gear.

7. The drive apparatus according to claim 1, wherein
   the first differential mechanism includes a first planetary gear mechanism, the first planetary gear mechanism including a first ring gear and a first sun gear,
   the second differential mechanism includes a second planetary gear mechanism, the second planetary gear mechanism including a second ring gear and a second sun gear,
   the first ring gear is coupled to the first left wheel,
   the second ring gear is coupled to the first right wheel, and
   the first sun gear and the second sun gear are each coupled to the common output shaft.

8. The drive apparatus according to claim 2, wherein
   the first differential mechanism includes a first planetary gear mechanism, the first planetary gear mechanism including a first ring gear and a first sun gear,
   the second differential mechanism includes a second planetary gear mechanism, the second planetary gear mechanism including a second ring gear and a second sun gear,
   the first ring gear is coupled to the first left wheel,
   the second ring gear is coupled to the first right wheel, and
   the first sun gear and the second sun gear are each coupled to the common output shaft.

9. The drive apparatus according to claim 3, wherein
   the first differential mechanism includes a first planetary gear mechanism, the first planetary gear mechanism including a first ring gear and a first sun gear,
   the second differential mechanism includes a second planetary gear mechanism, the second planetary gear mechanism including a second ring gear and a second sun gear,
   the first ring gear is coupled to the first left wheel,
   the second ring gear is coupled to the first right wheel, and
   the first sun gear and the second sun gear are each coupled to the common output shaft.

10. The drive apparatus according to claim 1, wherein
    the first left wheel and the first right wheel are rear wheels, and
    the second left wheel and the second right wheel are front wheels.

11. The drive apparatus according to claim 2, wherein
    the first left wheel and the first right wheel are rear wheels, and
    the second left wheel and the second right wheel are front wheels.

12. The drive apparatus according to claim 3, wherein
    the first left wheel and the first right wheel are rear wheels, and
    the second left wheel and the second right wheel are front wheels.

13. The drive apparatus according to claim 1, further comprising a limited slip differential gear in the first differential mechanism, the second differential mechanism, or each of the first and second differential mechanisms.

14. The drive apparatus according to claim 2, further comprising a limited slip differential gear in the first differential mechanism, the second differential mechanism, or each of the first and second differential mechanisms.

15. The drive apparatus according to claim 3, further comprising a limited slip differential gear in the first differential mechanism, the second differential mechanism, or each of the first and second differential mechanisms.

* * * * *